United States Patent
Patterson et al.

(10) Patent No.: US 9,589,224 B2
(45) Date of Patent: Mar. 7, 2017

(54) PASSIVE RFID TAGS WITH INTEGRATED CIRCUITS USING SUB-THRESHOLD TECHNOLOGY

(71) Applicants: Hubert A. Patterson, Boca Raton, FL (US); Melwyn F. Sequeira, Plantation, FL (US)

(72) Inventors: Hubert A. Patterson, Boca Raton, FL (US); Melwyn F. Sequeira, Plantation, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 14/956,433

(22) Filed: Dec. 2, 2015

(65) Prior Publication Data
US 2016/0155040 A1     Jun. 2, 2016

Related U.S. Application Data

(60) Provisional application No. 62/086,241, filed on Dec. 2, 2014.

(51) Int. Cl.
G06K 19/06     (2006.01)
G06K 19/07     (2006.01)
G06K 19/073   (2006.01)

(52) U.S. Cl.
CPC ..... *G06K 19/0723* (2013.01); *G06K 19/0707* (2013.01); *G06K 19/0708* (2013.01); *G06K 19/0711* (2013.01); *G06K 19/07327* (2013.01)

(58) Field of Classification Search
USPC ........................ 235/492, 451; 340/10.1, 10.3
See application file for complete search history.

(56) References Cited

U.S. PATENT DOCUMENTS

| | | |
|---|---|---|
| 5,532,705 A | 7/1996 | Hama |
| 5,763,868 A | 6/1998 | Kubota et al. |

(Continued)

FOREIGN PATENT DOCUMENTS

| | | |
|---|---|---|
| CN | 203825788 | 9/2014 |
| EP | 2495621 | 9/2012 |

(Continued)

OTHER PUBLICATIONS

Rais, N.H.M., et al., "A Review of Wearable Antenna," Antennas & Propagation Conference, 2009, LAPC 2009, Loughborough, Published IEEE; 978-1-4244-2720-8; DOI: 10.1109/LAPC.2009.5352373.

(Continued)

*Primary Examiner* — Ahshik Kim
(74) *Attorney, Agent, or Firm* — Fox Rothschild LLP; Robert J. Sacco; Carol E. Thorstad-Forsyth

(57) ABSTRACT

Systems and methods for operating an RFID transponder (102). The methods involve: performing energy harvesting operations by a voltage scavenging device (130) of the RFID transponder to collect energy from an RF field, magnetic field, heat, light or movement of the RFID transponder; increasing or decreasing, by a voltage converter of the RFID transponder, a voltage level of a signal received from the voltage scavenging device to a sub-threshold voltage level that is at least one order of magnitude below a normal operating range for the RFID transponder; and supplying an operating voltage at the sub-threshold voltage level to at least a transceiver circuit (124) of the RFID transponder.

20 Claims, 6 Drawing Sheets

(56) References Cited

U.S. PATENT DOCUMENTS

| | | | |
|---|---|---|---|
| 5,947,369 | A | 9/1999 | Frommer et al. |
| 6,788,262 | B1 | 9/2004 | Adams et al. |
| 6,888,502 | B2 | 5/2005 | Beigel et al. |
| 6,950,098 | B2 | 9/2005 | Brabander et al. |
| 7,424,316 | B1 | 9/2008 | Boyle |
| 7,450,077 | B2 | 11/2008 | Waterhouse et al. |
| 7,629,934 | B2 | 12/2009 | Rhodes et al. |
| 7,696,882 | B1 | 4/2010 | Rahimi et al. |
| 7,982,616 | B2 | 7/2011 | Banerjee et al. |
| 8,267,325 | B2 | 9/2012 | Phaneuf |
| 8,497,808 | B2 | 7/2013 | Wang |
| 8,599,101 | B2 | 12/2013 | Christie et al. |
| 8,646,695 | B2 | 2/2014 | Worrall et al. |
| 8,674,810 | B2 | 3/2014 | Uysal et al. |
| 8,917,214 | B2 | 12/2014 | Forster |
| 9,076,273 | B2 | 7/2015 | Smith et al. |
| 2002/0140558 | A1 | 10/2002 | Lian et al. |
| 2004/0246103 | A1 | 12/2004 | Zukowski |
| 2005/0285740 | A1 | 12/2005 | Kubach et al. |
| 2006/0219778 | A1 | 10/2006 | Komatsu |
| 2006/0238308 | A1 | 10/2006 | Mickle |
| 2007/0046369 | A1 | 3/2007 | Schober |
| 2007/0182559 | A1 | 8/2007 | Lawrence et al. |
| 2008/0055045 | A1 | 3/2008 | Swan et al. |
| 2009/0121931 | A1 | 5/2009 | Katz |
| 2009/0322513 | A1 | 12/2009 | Hwang et al. |
| 2010/0315244 | A1 | 12/2010 | Tokhtuev et al. |
| 2010/0328043 | A1* | 12/2010 | Jantunen .............. G06K 7/0008 340/10.3 |
| 2011/0022121 | A1 | 1/2011 | Meskins |
| 2011/0148602 | A1 | 6/2011 | Goh et al. |
| 2011/0181399 | A1 | 7/2011 | Pollack |
| 2011/0316700 | A1 | 12/2011 | Kasahara et al. |
| 2012/0056719 | A1 | 3/2012 | Krishna et al. |
| 2012/0234921 | A1 | 9/2012 | Tiedmann et al. |
| 2012/0242501 | A1 | 9/2012 | Tran et al. |
| 2012/0256492 | A1* | 10/2012 | Song ....................... H02J 1/102 307/66 |
| 2012/0286927 | A1 | 11/2012 | Hagl |
| 2013/0027180 | A1 | 1/2013 | Lakamraju et al. |
| 2013/0221938 | A1* | 8/2013 | Conte ....................... G05F 1/10 323/271 |
| 2013/0249301 | A1 | 9/2013 | Smoot |
| 2014/0077929 | A1 | 3/2014 | Dumas et al. |
| 2014/0159959 | A1 | 6/2014 | Rhoads et al. |
| 2014/0159975 | A1 | 6/2014 | Apostolos et al. |
| 2014/0226844 | A1 | 8/2014 | Kerselaers |
| 2014/0240087 | A1 | 8/2014 | Liu et al. |
| 2014/0354494 | A1 | 12/2014 | Katz |
| 2014/0375429 | A1* | 12/2014 | Cristache .............. G01S 13/876 340/10.1 |
| 2015/0041614 | A1 | 2/2015 | Tran et al. |
| 2015/0054696 | A1 | 2/2015 | Werner et al. |
| 2015/0149310 | A1 | 5/2015 | He et al. |
| 2015/0154486 | A1* | 6/2015 | McFarthing ....... G06K 19/0712 235/492 |
| 2015/0221147 | A1 | 8/2015 | Daniel-Wayman et al. |
| 2015/0264431 | A1 | 9/2015 | Cheng |
| 2015/0339870 | A1 | 11/2015 | Cojocaru et al. |
| 2015/0379791 | A1 | 12/2015 | Russell et al. |
| 2016/0007315 | A1 | 1/2016 | Lundgreen et al. |

FOREIGN PATENT DOCUMENTS

| | | |
|---|---|---|
| WO | 9941721 A1 | 8/1999 |
| WO | 2014/113882 A1 | 7/2014 |
| WO | 2014/210000 | 12/2014 |
| WO | 2015/023737 A1 | 2/2015 |

OTHER PUBLICATIONS

Hall, P.S., et al., "Antennas and Propagation for Body Centric Communications," Proc. 'EUCAP 2006', Nice, France, Nov. 6-10, 2006 (ESA SP-626, Oct. 2006).

Conway, G.A., et al., "Antennas for Over-Body-Surface Communication at 2.45 GHz," IEEE Transactions on Antennas and Propagation, vol. 57, No. 4, Apr. 2009, 0018-926X, copyright 2009 IEEE.

Ito, K., et al., "Wearable Antennas for Body-Centric Wireless Communications," copyright IEEE 2010; 978-1-4244-6418-0/10.

Matthews, J.C.G., et al., "Body Wearable Antennas for UHF/VHF," 2008 Loughborough Antennas & Propagation Conference, 978-1-4244-1894-7/08, copyright 2008 IEEE.

* cited by examiner

PASSIVE RFID TAGS WITH INTEGRATED CIRCUITS USING SUB-THRESHOLD TECHNOLOGY

CROSS-REFERENCE TO RELATED APPLICATIONS

This application claims priority benefits of U.S. Provisional Patent Application No. 62/086,241 filed on Dec. 2, 2014, the contents of which are herein incorporated by reference.

BACKGROUND OF THE INVENTION

Statement of the Technical Field

The present invention relates generally to Integrated Circuits ("ICs"). More particularly, the present invention relates to passive Radio Frequency Identification ("RFID") tags including ICs using sub-threshold technology.

Description of the Related Art

RFID technology has conventionally been used to transfer data for purposes of automatically identifying and tracking RFID tags attached to objects. In this regard, the RFID tags have information stored in a data store thereof, such as a unique identifier. During operation, the RFID tags transmit a response to a signal received from an RFID reader by backscattering the received signal. At a minimum, the response signal includes the unique identifier.

Some RFID tags are passive. Passive RFID tags get their operating power by harvesting energy from the signal received from an RFID reader. More specifically, the RFID tags are powered by electromagnetic induction from magnetic fields produced near a reader thereof by a local radiator. Electromagnetic induction is the production of an electromotive force across a conductor when it is exposed to a varying magnetic field. Passive RFID tags have many advantages such as low cost, light weight, small form factor and long operational life. However, passive RFID tags have a limited read range since only a few microwatts can be harvested from the received signal.

Gains in the read range have occurred because the power needed to run the passive RFID tags has decreased over time. Additionally, the passive RFID tags' sensitivity to incoming signals has gone down over time. However, in general, the small antennas of the passive RFID tags limit the amount of power supplied thereto. In effect, the read range of the passive RFID tags is still limited to 2-10 meters from the RFID reader.

SUMMARY OF THE INVENTION

The present disclosure concerns systems and methods for operating an RFID transponder. The methods involve: performing energy harvesting operations by a voltage scavenging device of the RFID transponder to collect energy from an RF field, magnetic field, heat, light or movement of the RFID transponder; increasing or decreasing, by a voltage converter of the RFID transponder, a voltage level of a signal received from the voltage scavenging device to a sub-threshold voltage level that is at least one order of magnitude below a normal operating range for the RFID transponder; and supplying an operating voltage at the sub-threshold voltage level to at least a transceiver circuit of the RFID transponder.

In some scenarios, the normal operating range for a voltage level is 1.2 Volts to 3.6 Volts. The sub-threshold voltage level is within 200 milli-Volts to 600 milli-Volts. The voltage level is increased to the sub-threshold voltage level when the energy is collected from the RF Field, magnetic field, heat or light. The voltage level is decreased to the sub-threshold voltage level when the energy is collected from light or movement of the RFID transponder.

The energy harvesting operations involve: capturing RF energy emitted within a surrounding environment from equipment; passing the RF energy through a switch that is normally in a position which provides an electrical connection between an antenna of the RFID transponder and a full wave rectifier of the RFID transponder; converting the RF energy into direct current for generating electric power; supplying the electric power to an energy storage device (e.g., a super capacitor) of the RFID transponder for charging the energy storage device to a pre-determined voltage level; and supplying power from the energy storage device to a controller of the RFID transponder when a voltage level of the energy storage device is equal to or greater than the pre-determined voltage level. The controller may also generate and send a switch control signal to the switch to cause the switch to change positions such that that switch is disconnected from the antenna and connected to a transceiver of the RFID transponder. Information may also be communicated from the RFID transponder to an external device. The information can include, but is not limited to, information that is useful for determining whether to grant or deny a person access to a restricted area.

BRIEF DESCRIPTION OF THE DRAWINGS

Embodiments will be described with reference to the following drawing figures, in which like numerals represent like items throughout the figures, and in which.

DETAILED DESCRIPTION OF THE INVENTION

Figure 1:
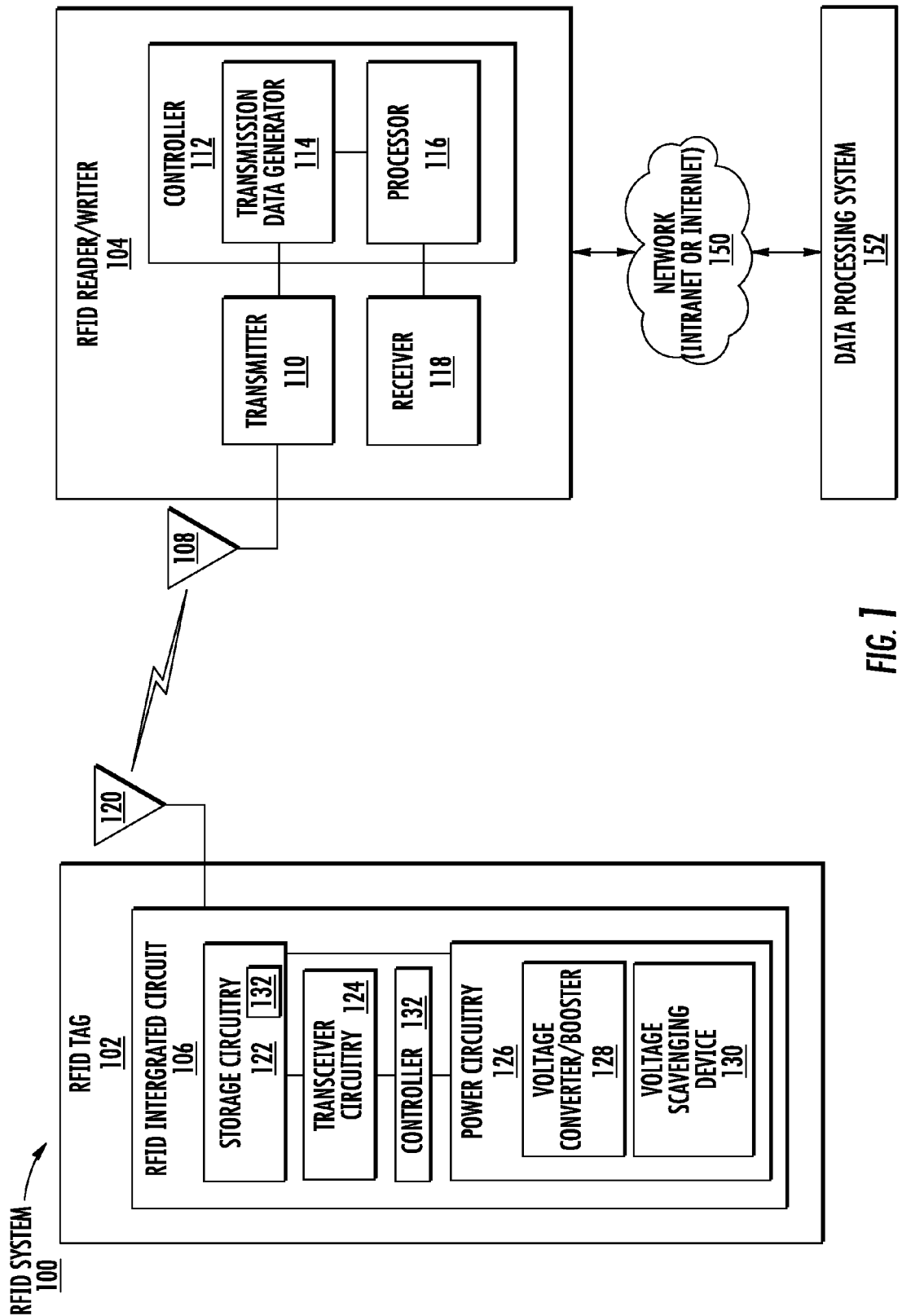
FIG. 1 is a schematic illustration of an exemplary architecture for an RFID system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present invention may be implemented on one or any combination of hardware, firmware and software. The present invention may also be implemented as instructions contained in or on a machine-readable medium, which may be read and executed by one or more processors to enable performance of the operations described herein. A machine-readable medium may include any mechanism for storing, transmitting and/or receiving information in a form readable by a machine (e.g., a computer). For example, a machine-readable medium may include a tangible storage medium, such as but not limited to Read Only Memory ("ROM"), Random Access Memory ("RAM"), magnetic disc storage media, optical storage media, and/or a flash memory device. A machine-readable medium may also include a propagated signal which has been modulated to encode the instructions, such as but not limited to electromagnetic, optical or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some scenarios they might not.

Referring now to FIG. 1, the present invention concerns an RFID tag system 100 including an RFID tag 102 and an RFID reader/writer 104. The RFID tag 102 (also referred to as an RFID transponder) comprises an RFID antenna 120 and an RFID IC 106. The RFID antenna 120 receives incoming wireless signals and transmits wireless responses in the form of modulated radio frequency signals. The RFID reader/writer 104 wirelessly receives the responses transmitted from the RFID tag 102. In some scenarios, the RFID reader/writer 104 also transmits data and/or instructions to the RFID tag 102. RFID readers/writers are well known in the art, and therefore will not be described herein. Any known or to be known RFID reader/writer can be used herein without limitation.

In some scenarios, the RFID reader/writer 104 comprises an antenna 108, transmitter 110, controller 112 and a receiver 118. The controller 112 includes a transmission data generator 114 and a processor 116. Each of the listed components 104-116 is known in the art, and therefore is not described in detail herein. Still, it should be understood that these components facilitate: the wireless reception of response signals transmitted from the RFID tag 102; and/or the wireless transmission of data and/or instructions to the RFID tag 102.

Notably, the RFID tag 102 is a passive device that obtains its operating power by harvesting energy from RF fields, magnetic fields, heat, movement and/or light. In the RF field scenarios, the incoming wireless signals serve to activate the RFID tag 102. In other scenarios, the RFID tag 102 is activated in response to a detection of heat, movement and/or light as described in more detail below.

As shown in FIG. 1, the RFID IC 106 includes storage circuitry 122 to store a unique identifier of the RFID tag and/or other information. The storage circuitry 122 may include volatile memory and/or non-volatile memory. For example, the memory can include, but is not limited to, a Random Access Memory ("RAM"), a Dynamic Random Access Memory ("DRAM"), a Static Random Access Memory ("SRAM"), a Read-Only Memory ("ROM") and/or a flash memory. The memory may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

In some scenarios, the storage circuitry 122 comprises a computer-readable storage medium (not shown) on which is stored one or more sets of instructions 132 (e.g., software code) configured to implement one or more of the methodologies, procedures, or functions described herein. The instructions 132 can also reside, completely or at least partially, within the storage circuitry 122. The storage circuitry 122 also can constitute machine-readable media. The term "machine-readable media", as used here, refers to a single medium or multiple media (e.g., a flash memory, a RAM, a ROM, etc.) that store the one or more sets of instructions 132. The term "machine-readable media", as used here, also refers to any medium that is capable of storing, encoding or carrying a set of instructions 132 for execution by the RFID tag 102 and that cause the RFID tag 102 to perform any one or more of the methodologies of the present disclosure.

The RFID IC 106 also includes receive circuitry 124 to receive incoming wireless signals through the antenna 120, transmit circuitry 124 to transmit the unique identifier and/or other information through the antenna 120, and power circuitry 126 to collect received energy from RF fields, magnetic fields, heat, movement and/or light. The collected energy is used to power the operations of the RFID tag 102. Receive and transmit circuitry is well known in the art, and therefore will not be described herein.

In the present invention, the RFID IC 106 runs at a sub-threshold power or voltage level. The term "sub-threshold", as used herein, means that a power level and/or voltage level falls at least one order of magnitude below a normal operating range for a given device. For example, traditional processing systems normally operate at a power level at approximately 3 milli-Watts and/or a voltage level within 1.2 Volts to 3.6 Volts. In contrast, the RFID IC 106 runs at a sub-threshold power level at approximately 3 micro-Watts and/or a voltage level within 200 milli-Volts to 600 milli-Volts.

For example, the RFID IC 106 may include a diode junction (or rectifier) to rectify an incoming signal and a transistor to switch the incoming signal to/from a transceiver. In conventional RFID tags, the input voltage needed to operate the diode junction and transistor is of a threshold voltage level (e.g., 1.5-3.0 Volts, 0.7 volts for the diode junction and 0.6 volts for the transistor). In contrast, the input voltage needed to operate the diode junction and transistor of the RFID tag 102 is of a sub-threshold voltage level (e.g., 0.6 Volts) which is lower than the threshold voltage level (e.g., 1.5-3.0 Volts) of conventional RFID tags. For example, in the present invention, 0.3-0.4 Volts may be supplied to the diode bridge and 0.2-0.3 Volts may be supplied to the transistor. In effect, the operating voltage required to operate the RFID tag 102 is substantially reduced (e.g., from 1.5-3.0 Volts to 0.6 Volts) as compared to that of conventional RFID tags. In some scenarios, the diode bridge employed by the present solution comprise low drop out diodes which enable active rectification at less than 20 milli-Volts compared to conventional diodes which enable rectification at 300-700 milli-Volts.

In this regard, the power circuitry 126 of the RFID IC 106 comprises low power voltage scavenging device(s) 130 and voltage converter(s) 128. The voltage scavenging device(s) 130 are generally configured to collect received energy from RF fields, magnetic fields, heat, movement and/or light. Accordingly, the voltage scavenging device(s) 130 include (s), but is(are) not limited to, low power RF field scavenging devices, low power magnetic field scavenging device, low power thermal scavenging devices, low power piezo devices, and low power photo voltaic scavenging devices. In all scenarios, the voltage scavenging device(s) 130 is(are) sized and shaped to minimize the amount of space taken up thereby on the RFID tag 102 having a height≤approximately 2 inches and a width≤approximately 3 inches.

Figure 2:
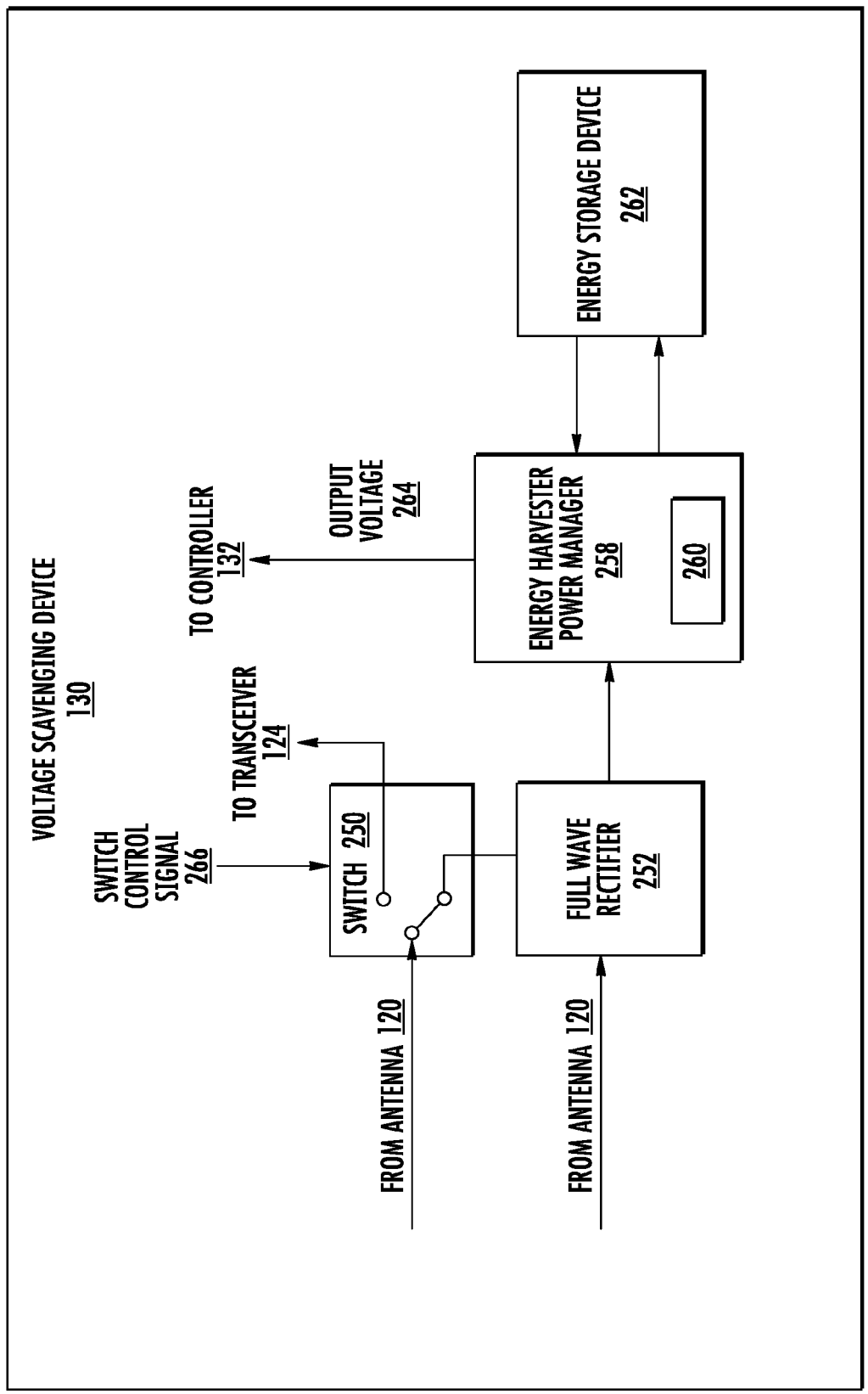
FIG. 2 is a block diagram of an exemplary architecture for the voltage scavenging device shown in FIG. 1.

For example, the voltage scavenging device(s) 130 can include, but is not limited to, a device having a part number BQ25570 which is available from Texas Instruments of Dallas, Tex. Additionally or alternatively, the voltage scavenging device(s) 130 can include, but is not limited to, that shown in FIG. 2 and discussed below. The architecture of FIG. 2 is applicable to RF scenarios and/or other scenarios in which the input voltage from the antenna 120 is Alternating Current ("AC"). The architecture of FIG. 2 can be modified for applicability in scenarios in which the input voltage from the antenna 120 is Direct Current ("DC"). For example, full wave rectifier 252 can be eliminated from the voltage scavenging device 130 in the DC scenarios.

The voltage converter(s) 128 comprises an electric power converter which changes the output voltage of an electrical power source, such as a low power voltage scavenging device(s) 130. The voltage converter(s) 128 includes, but is not limited to, an inverter, a semiconductor switch (e.g., a transistor), passive components (e.g., inductors, capacitors, resistors, and/or diodes), and/or a transformer to change the voltage of AC power.

In all scenarios, the voltage converter(s) 128 raise(s) or lower(s) the level of an input voltage received from the voltage scavenging device(s) 130 to the sub-threshold voltage level (e.g., 0.6 Volts). For example, in the RF field, magnetic field, thermal or light power scavenging scenarios, the input voltage (e.g., 30 millivolts or 0.5 Volts) may be increased to the sub-threshold voltage level (e.g., 0.6 Volts). In contrast, in the movement or light power scavenging scenarios, the input voltage (e.g., >0.6 Volt) may be lowered to the sub-threshold voltage level (e.g., 0.6 Volts).

Reducing the required operating voltage of the RFID tag 102 means a lower field level (volts per meter) is required for a given antenna size. In addition, running the RFID tag 102 at a sub-threshold power or voltage level means the RFID IC 106 operates more slowly than normal super-threshold ICs, but runs at 100-1000 times lower current. Furthermore, operating the RFID tag 102 at sub-threshold levels allows the output antenna power of the RFID reader/writer 104 to be significantly lowered as compared to conventional non sub-threshold based RFID systems.

The RFID IC 106 can be created by (1) changing the processing parameters for the mask sets during fabrication, (2) changing the implantation rules for dopants and/or (3) changing processing parameters. However, the RFID IC 106 can be made on regular CMOS fabrication lines without affecting the normal operation of the line. This allows most FAB lines to create sub-threshold electronics on their standard lines using the normal mask processes used in fabrication.

Normally, running the RFID IC 106 at half the voltage would cut the current by half as well as result in an IC operating at one quarter of the power. However, in this situation, the required power is reduced by 25-250 times more because of lower circuit losses and a slower operating speed. This lower power allows the very low input voltages into a voltage booster 128 to supply sufficient power to operate the RFID IC 106.

The advantages of running the RFID IC 106 at a sub-threshold power or voltage level are substantial. For example, the RFID IC 106 is ideally suited to working with energy harvesting devices which are notorious for supplying very low power and voltages. Just as important is the RFID IC's 106 use with resulting inlays or RFID tags. Since the operating power of the RFID IC 106 is substantially reduced, the read range for a given sized inlay is ten to fifteen times larger as compared to that of conventional RFID tags. For example, an inlay that is only one centimeter long can operate like a conventional inlay that is ten to fifteen centimeters long. Notably, the size of the antenna 120 can be reduced as compared to that of conventional RFID tags, while still maintaining the larger read range. The size reductions of the inly and antenna provide significant advantages when placing the RFID IC 106 in/on packaging or incorporating the RFID IC 106 into a swing ticket or price label.

Referring now to FIG. 2, there is provided a detailed block diagram of an exemplary architecture for the voltage scavenging device 130 of FIG. 1. The voltage scavenging device 130 is generally configured to derive energy from an external source to power other electronic components internal to RFID tag 102. The voltage scavenging device 130 comprises a switch 250, a full wave rectifier 252, an energy harvester power manager 258, and an energy storage device 262. In some scenarios, the voltage scavenging device 130 may also comprise matching circuits (not shown) to optimize a power transfer from an antenna 120 of the RFID tag 102 and/or to impedance match the antenna to a transceiver 124 of the RFID tag 102. Antenna 120 can include any known or to be known antenna. For example, in some scenarios, the antenna comprises an antenna described in U.S. Patent Publication No. 2015/0054696. The present invention is not limited in this regard.

In some scenarios, the energy storage device 262 comprises a super capacitor. The switch 250 includes a Field Effect Transistor ("FET") switch. The FET switch may comprise a Heterostructure FET ("HFET") which without applied power directly couples the antenna 120 to the voltage scavenging device electronics. The present invention is not limited to the particulars of these scenarios.

During operation, RF energy is emitted within a surrounding environment from equipment disposed within a facility (e.g., at an access point of a restricted area). Upon entering into the RF field which corresponds to the antenna operating frequency, the voltage scavenging device 130 charges up the energy storage device 262 (e.g., a super capacitor) to a pre-determined voltage level. In this regard, it should be understood that the switch 250 is normally in a position which provides an electric connection or closed circuit between the antenna 120 and the full wave rectifier 252, as shown in FIG. 2. In the absence of an energy source (and hence the application of a voltage to power the switch), the switch 250 is in an indeterminate state causing the RF signal to bleed through both channels thereof, but with significantly reduced output. However, the voltage output is sufficient to turn on or enable the voltage scavenging device electronics 252, 258, 262 such that RF energy can be captured thereby.

Figure 3:
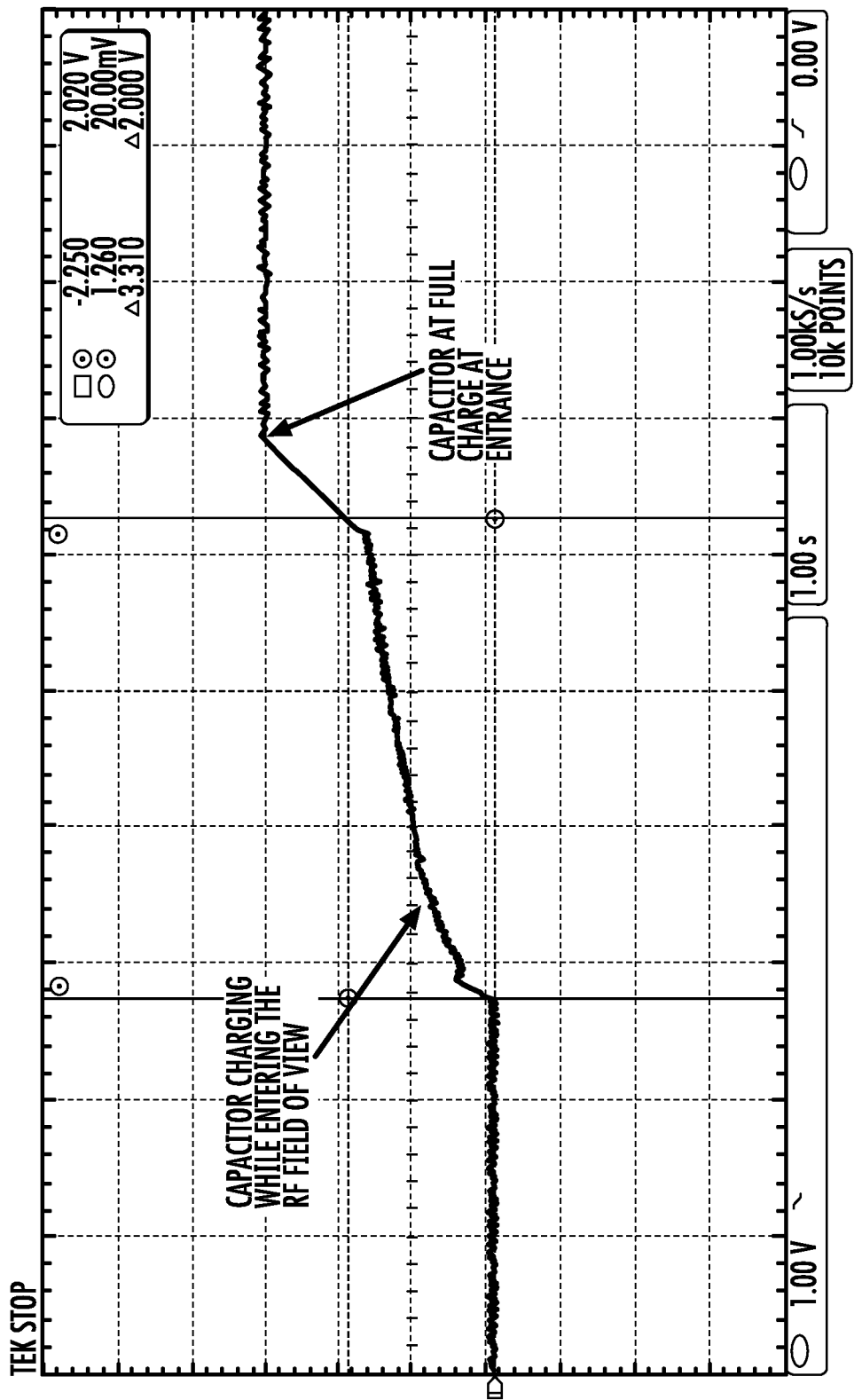
FIG. 3 is a graph that is useful for understanding the charging of an energy storage device.

The captured RF energy is passed through the switch 250 by virtue of the switches characteristics described above. The energy harvester power manager 258 converts the received RF energy into direct current for generating electric power. The electric power is supplied to the energy storage device 262 (e.g., a super capacitor) for charging the same to the pre-determined voltage level. A graph is provided in FIG. 3 that is useful for understanding the charging of an energy storage device, such as a capacitor. The voltage of the energy storage device 262 is sufficient to power up the components 124, 132 of the RFID IC 106 as the RFID tag 102 passes through or within the RF field generated by the external device (e.g., a wireless edge device located at an entryway of a facility).

When the energy storage device 262 is charged to the pre-determined voltage level, power is supplied from the energy storage device 262 to the controller 132 via the energy harvester power manager 258. The controller 132 generates and sends a switch control signal 266 to the switch 250. The switch control signal 266 includes a command to cause the switch 250 to change positions. In effect, the switch 250 is disconnected from the voltage scavenging device 130, whereby an open circuit is formed between the antenna 120 and the full wave rectifier 252. The switch 250 is connected to the transceiver 124 so as to allow communication of information from the RFID tag 102 to a nearby communications device. Next, the controller 132 initiates communications with the external device such that certain information is passed from the RFID tag 102 to the external device. The external device processes the received information for pre-specified purposes (e.g., authentication of a user, verification of a successful purchase, tracking of an item, etc.).

The antenna 120 of the RFID tag 102 may comprise a directional antenna arranged to point away from an item, article, object or person when the RFID tag 102 is attached thereto. The antenna 120 is coupled to Short Range Communication ("SRC") components 122, 124, 132 of the RFID IC 106 implementing SRC technology. The SRC technology includes, but is not limited to, RF technology which uses RF electromagnetic fields to identify RFID tags, items, articles, objects or persons when they come close to the RFID reader/writer 104. Accordingly, SRC components facilitate communication of at least one unique identifier and/or other information to the RFID reader/writer 104 via SRC reply signals in response to interrogation signals sent from the RFID reader/writer 104. The unique identifier is then used by the RFID reader/writer 104 to at least automatically identify the RFID tag, item, article, object or person.

Figure 4:
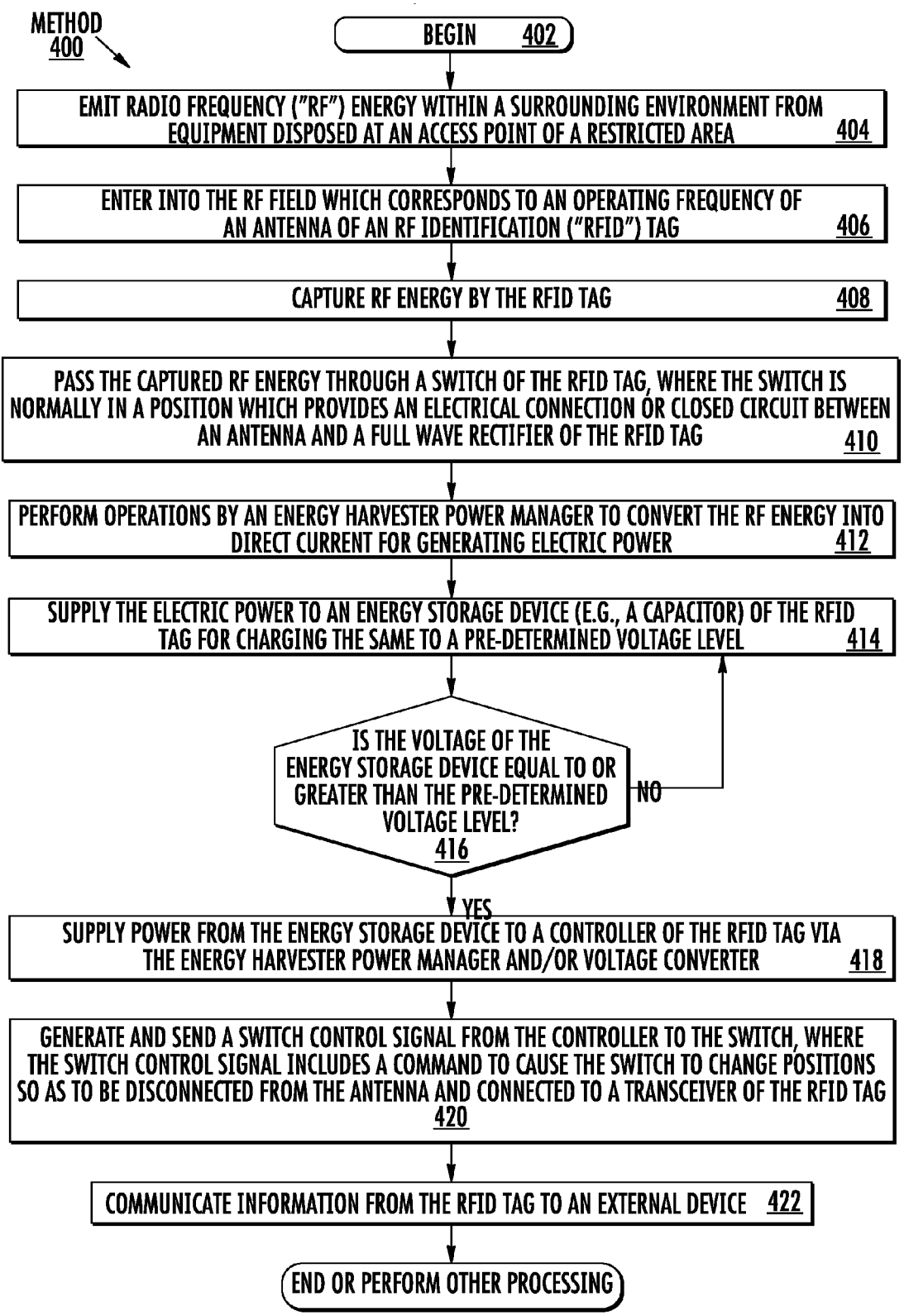
FIG. 4 is a flow diagram of an exemplary method for operating an RFID tag.

Referring now to FIG. 4, there is provided a flow diagram of an exemplary method 400 for operating an RFID tag (e.g., RFID tag 102 of FIG. 1). Method 400 begins with step 402 and continues with step 404 where RF energy is emitted within a surrounding environment from equipment disposed at an access point of a restricted area. Next in step 406, the RFID tag enters into the RF field at an operating frequency of an antenna of the RFID tag. As a result, RF energy is captured by the RFID tag as shown by step 408. The captured RF energy is passed through a switch (e.g., switch 250 of FIG. 2) of the RFID tag, as shown by step 410. The switch is normally in a position which provides an electrical connection or closed circuit between an antenna (e.g., antenna 120 of FIG. 1) and a full wave rectifier (e.g., full wave rectifier 252 of FIG. 2) of the RFID tag. An energy harvester power manager (e.g., energy harvester power manager 258 of FIG. 2) then performs operations in step 412 to convert the RF energy into direct current for generating electric power. The electric power is supplied to an energy storage device (e.g., energy storage device 262 of FIG. 2) of the RFID tag in step 414 for charging the same to a pre-determined voltage level. If the voltage of the energy storage device (e.g., a capacitor) is not equal to or greater than the pre-determined voltage level [416:NO], then method 400 returns to step 414 so that the energy storage device continues to be charged.

If the voltage of the energy storage device (e.g., a capacitor) is equal to or greater than the pre-determined voltage level [416:YES], then steps 418-422 are performed. These steps involve: supplying power from the energy storage device to a controller (e.g., controller 132 of FIG. 1) of the RFID tag via the energy harvester power manager and/or voltage converter; generating and sending a switch control signal from the controller to the switch so as to cause the switch to change positions so as to be disconnected from the antenna and connected to a transceiver of the RFID tag; and communicating information from the RFID tag to an external device. Upon completing step 422, step 424 is performed where method 400 ends or other processing is performed.

Figure 5A:
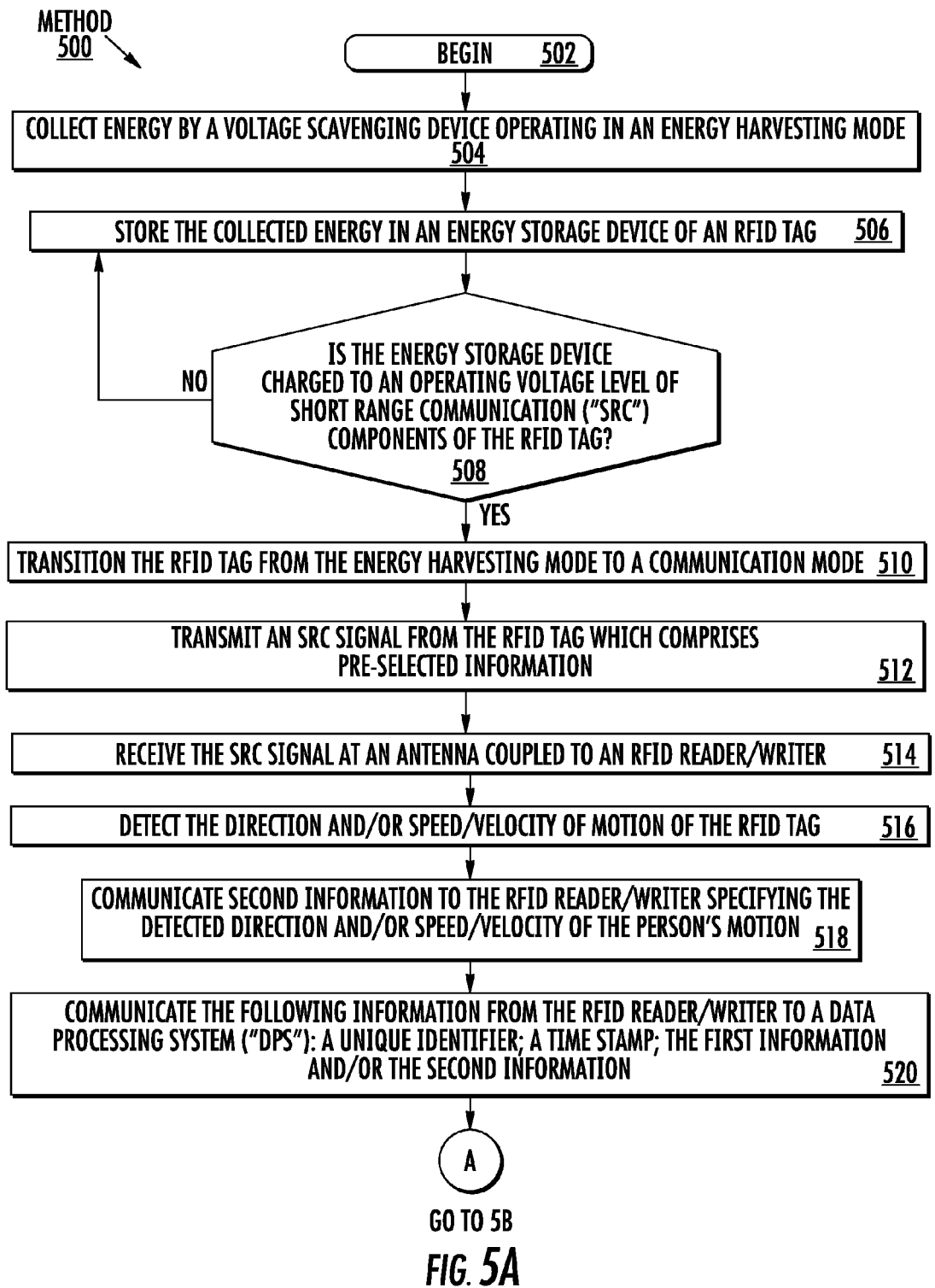
FIGS. 5A-5B (collectively referred to as "FIG. 5") provide a flow diagram of an exemplary method for controlling access to a restricted area.
Figure 5B:
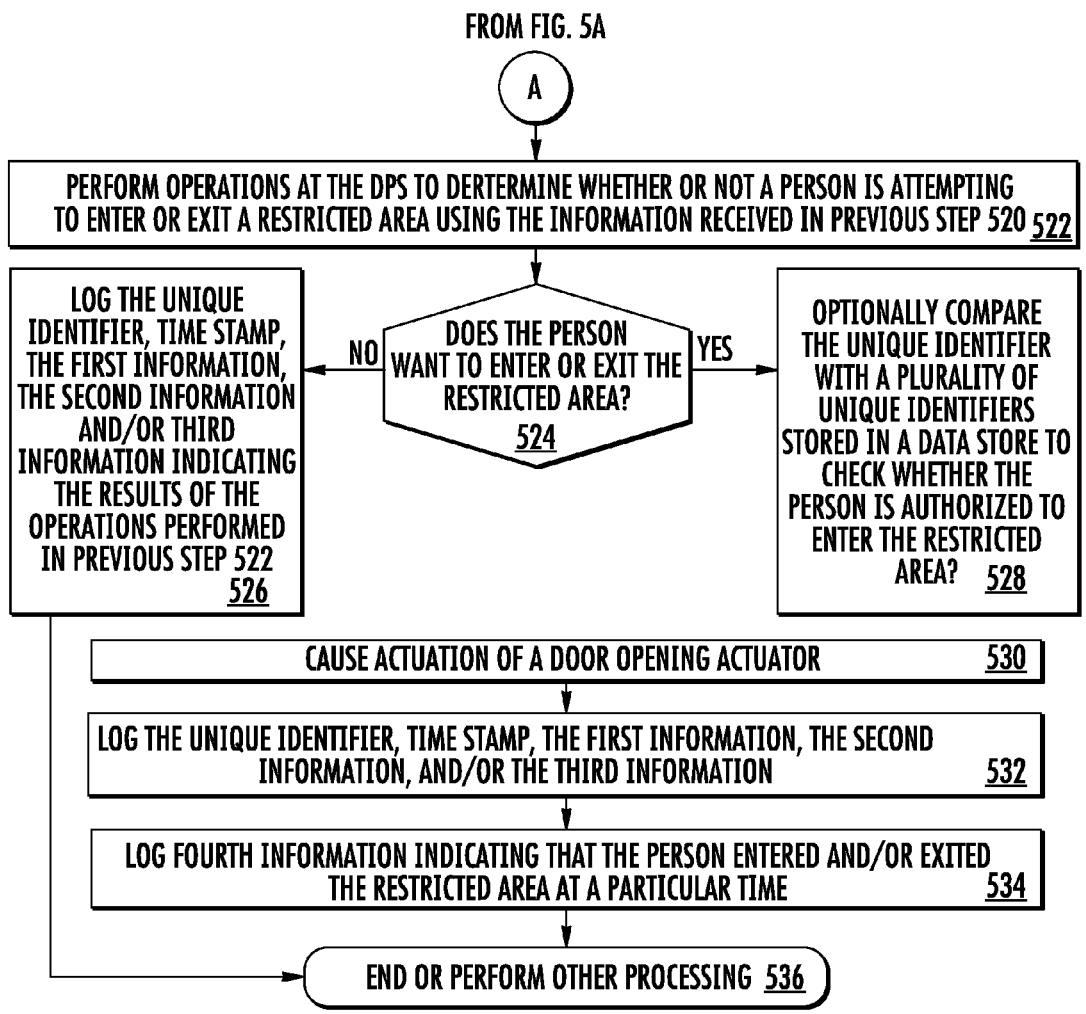

Referring now to FIG. 5, there is provided a flow diagram of an exemplary method 500 for controlling access to a restricted area using an RFID system (e.g., RFID system 100 of FIG. 1). Method 500 begins with step 502 and continues with step 504 where a voltage scavenging device (e.g., voltage scavenging device 130 of FIGS. 1-2) of an RFID tag (e.g., RFID tag 102 of FIG. 1) collects energy. The collected energy is then stored in an energy storage device (e.g., energy storage device 262 of FIG. 2) of the RFID tag. When the energy storage device charges to an operating voltage level of the SRC components (e.g., components 122, 124, 132 of FIG. 1) of the RFID tag, step 510 is performed where the RFID tag is transitioned from its energy harvesting mode to its communication mode. In its communication mode, step 512 is performed. Step 512 involves transmitting an SRC signal from the RFID tag. In some access control scenarios, the SRC signal includes, but is not limited to, a unique identifier and/or first information indicating a rate of change of the charging voltage of the energy storage device. The SRC signal is then received in step 514 at an antenna (e.g., antenna 108 of FIG. 1) coupled to an RFID reader/writer (e.g., RFID reader/writer 104 of FIG. 1).

In a next step 516, the direction and/or speed/velocity of motion of the RFID tag is detected. Techniques for detecting the direction and/or speed/velocity of motion are well known in the art. Any known or to be known technique can be used herein without limitation. Thereafter in step 518, second information is communicated to the RFID reader/writer specifying the detected direction and/or speed/velocity of the RFID tag's motion. The RFID reader/writer then communicates the following information to a data processing system (e.g., data processing system 152 of FIG. 1): the unique identifier, a time stamp, the first information; and/or the second information (as shown by step 520). After completing step 520, method 500 continues with step 522 of FIG. 5B.

At the data processing system, operations are performed in step 522 to determine whether or not a person is attempting to enter or exit the restricted area using the information received in previous step 520. For example, if the received information indicates that the RFID tag is traveling towards an entrance in a first direction, then a determination is made that the person desires to enter the restricted area via an access point (e.g., a doorway). In contrast, if the received information indicates that the RFID tag is traveling towards an exit in a second direction opposed from the first direction, then a determination is made that the person desired to exit the restricted area via the access point. If the received information indicates that the RFID tag is traveling away from the entrance, then a determination is made that the person is not trying to enter the restricted area. Similarly, if the received information indicates that the RFID tag is traveling away from the exit, then a determination is made that the person is not trying to exit the restricted area. The present invention is not limited to the particulars of these examples. In this regard, it should be understood that the data processing system additionally or alternatively analyzes patterns of motion defined by the received information to determine whether or not the person desires to enter or exit the access point.

After completing step 522, method 500 continues with a decision step 524. If it is determined that the person does not want to enter or exit the restricted area [524:NO], then step 526 is performed where the following information is logged in a data store: the unique identifier; a time stamp; the first information; the second information; and/or the third information indicating the results of the operations performed in previous step 522. Subsequently, step 536 is performed where method 500 ends or other processing is performed.

If it is determined that the person does want to enter or exit the restricted area [524:YES], then step 530 is performed where the data processing system performs actions to cause actuation of a door opening actuator (e.g., a lock). Upon completing step 530, steps 532-534 are performed to log the following information: the unique identifier; the time stamp; the first information; the second information; the third information; and/or the fourth information indicating that the person entered or exited the restricted area at a particular time. Thereafter, step 536 is performed where method 500 ends or other processing is performed.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for operating a Radio Frequency Identification ("RFID") transponder, comprising:
    performing energy harvesting operations by a voltage scavenging device of the RFID transponder to collect energy from a Radio Frequency ("RF") field and store the energy in an energy storage device of the voltage scavenging device;
    causing a switch to change positions, when the energy storage device is charged to a pre-determined voltage level, from
        (A) a first position in which a closed circuit is formed between an antenna and the voltage scavenging device, and
        (B) a second position in which (i) an open circuit is formed between the antenna and the voltage scavenging device and (ii) a closed circuit is formed between the antenna and a transceiver circuit of the RFID transponder;
    increasing or decreasing, by a voltage converter of the RFID transponder, a voltage level of a signal received from the voltage scavenging device to a sub-threshold voltage level that is at least one order of magnitude below a normal operating range for the RFID transponder; and
    supplying an operating voltage at the sub-threshold voltage level to at least the transceiver circuit.

2. The method according to claim 1, wherein the normal operating range for a voltage level is 1.2 Volts to 3.6 Volts.

3. The method according to claim 1, wherein the energy harvesting operations involve:
    capturing RF energy emitted within a surrounding environment from equipment;
    passing the RF energy through the switch;
    converting the RF energy into direct current for generating electric power;
    supplying the electric power to the energy storage device for charging the energy storage device to a pre-determined voltage level; and
    supplying power from the energy storage device to a controller of the RFID transponder when a voltage level of the energy storage device is equal to or greater than the pre-determined voltage level.

4. The method according to claim 3, wherein the energy storage device comprises a super capacitor.

5. The method according to claim 3, further comprising generating and sending a switch control signal from the controller to the switch to cause the switch to change positions.

6. The method according to claim 3, further comprising communicating information from the RFID transponder to an external device.

7. The method according to claim 6, wherein the information is useful for determining whether to grant or deny a person access to a restricted area.

8. A method for operating a Radio Frequency Identification ("RFID") transponder, comprising:

performing energy harvesting operations by a voltage scavenging device of the RFID transponder to collect energy from a Radio Frequency ("RF") field, magnetic field, heat, light or movement of the RFID transponder;
increasing or decreasing, by a voltage converter of the RFID transponder, a voltage level of a signal received from the voltage scavenging device to a sub-threshold voltage level that is at least one order of magnitude below a normal operating range for the RFID transponder; and
supplying an operating voltage at the sub-threshold voltage level to at least a transceiver circuit of the RFID transponder;
wherein the sub-threshold voltage level is within 200 milli-Volts to 600 milli-Volts.

9. A method for operating a Radio Frequency Identification ("RFID") transponder, comprising:
performing energy harvesting operations by a voltage scavenging device of the RFID transponder to collect energy from a Radio Frequency ("RF") field, magnetic field, heat, light or movement of the RFID transponder;
increasing or decreasing, by a voltage converter of the RFID transponder, a voltage level of a signal received from the voltage scavenging device to a sub-threshold voltage level that is at least one order of magnitude below a normal operating range for the RFID transponder; and
supplying an operating voltage at the sub-threshold voltage level to at least a transceiver circuit of the RFID transponder;
wherein the voltage level is increased to the sub-threshold voltage level when the energy is collected from the RF Field, magnetic field, heat or light.

10. A method for operating a Radio Frequency Identification ("RFID") transponder, comprising:
performing energy harvesting operations by a voltage scavenging device of the RFID transponder to collect energy from a Radio Frequency ("RF") field, magnetic field, heat, light or movement of the RFID transponder;
increasing or decreasing, by a voltage converter of the RFID transponder, a voltage level of a signal received from the voltage scavenging device to a sub-threshold voltage level that is at least one order of magnitude below a normal operating range for the RFID transponder; and
supplying an operating voltage at the sub-threshold voltage level to at least a transceiver circuit of the RFID transponder;
wherein the voltage level is decreased to the sub-threshold voltage level when the energy is collected from light or movement of the RFID transponder.

11. A Radio Frequency Identification ("RFID") transponder, comprising:
a voltage scavenging device that performs energy harvesting operations to collect energy from a Radio Frequency ("RF") field and store the energy in an energy storage device of the voltage scavenging device;
a switch that is caused to change positions, when the energy storage device is charged to a pre-determined voltage level, from
(A) a first position in which a closed circuit is formed between an antenna and the voltage scavenging device, and
(B) a second position in which (i) an open circuit is formed between the antenna and the voltage scavenging device and (ii) a closed circuit is formed between the antenna and a transceiver circuit; and a voltage converter that increases or decreases a voltage level of a signal received from the voltage scavenging device to a sub-threshold voltage level that is at least one order of magnitude below a normal operating range for the RFID transponder;
wherein the transceiver circuit is supplied an operating voltage at the sub-threshold voltage level.

12. The RFID transponder according to claim 11, wherein the normal operating range for a voltage level is 1.2 Volts to 3.6 Volts.

13. The RFID transponder according to claim 11, wherein the energy harvesting operations involve:
capturing RF energy emitted within a surrounding environment from equipment;
passing the RF energy through the switch;
converting the RF energy into direct current for generating electric power;
supplying the electric power to the energy storage device for charging the energy storage device to a pre-determined voltage level; and
supplying power from the energy storage device to a controller of the RFID transponder when a voltage level of the energy storage device is equal to or greater than the pre-determined voltage level.

14. The RFID transponder according to claim 13, wherein the energy storage device comprises a super capacitor.

15. The RFID transponder according to claim 13, further comprising a controller that generates and sends a switch control signal to the switch to cause the switch to change positions.

16. The RFID transponder according to claim 13, wherein the transceiver circuit communicates information to an external device when the operating voltage is supplied thereto at the sub-threshold voltage level.

17. The RFID transponder according to claim 16, wherein the information is useful for determining whether to grant or deny a person access to a restricted area.

18. A Radio Frequency Identification ("RFID") transponder, comprising:
a voltage scavenging device that performs energy harvesting operations to collect energy from a Radio Frequency ("RF") field, magnetic field, heat, light or movement of the RFID transponder;
a voltage converter that increases or decreases a voltage level of a signal received from the voltage scavenging device to a sub-threshold voltage level that is at least one order of magnitude below a normal operating range for the RFID transponder; and
a transceiver circuit that is supplied an operating voltage at the sub-threshold voltage level;
wherein the sub-threshold voltage level is within 200 milli-Volts to 600 milli-Volts.

19. A Radio Frequency Identification ("RFID") transponder, comprising:
a voltage scavenging device that performs energy harvesting operations to collect energy from a Radio Frequency ("RF") field, magnetic field, heat, light or movement of the RFID transponder;
a voltage converter that increases or decreases a voltage level of a signal received from the voltage scavenging device to a sub-threshold voltage level that is at least one order of magnitude below a normal operating range for the RFID transponder; and
a transceiver circuit that is supplied an operating voltage at the sub-threshold voltage level;

wherein the voltage level is increased to the sub-threshold voltage level when the energy is collected from the RF Field, magnetic field, heat or light.

20. A Radio Frequency Identification ("RFID") transponder, comprising:
- a voltage scavenging device that performs energy harvesting operations to collect energy from a Radio Frequency ("RF") field, magnetic field, heat, light or movement of the RFID transponder;
- a voltage converter that increases or decreases a voltage level of a signal received from the voltage scavenging device to a sub-threshold voltage level that is at least one order of magnitude below a normal operating range for the RFID transponder; and
- a transceiver circuit that is supplied an operating voltage at the sub-threshold voltage level;
- wherein the voltage level is decreased to the sub-threshold voltage level when the energy is collected from light or movement of the RFID transponder.

* * * * *